United States Patent
Tsuchiya

(10) Patent No.: US 11,686,534 B2
(45) Date of Patent: Jun. 27, 2023

(54) HEAT SOURCE STORAGE SYSTEM UTILIZING SOLAR POWER GENERATION

(71) Applicant: Tsuchiya Dairy Equipment Manufacturing Co., Obihiro (JP)

(72) Inventor: Noriaki Tsuchiya, Obihiro (JP)

(73) Assignee: Tsuchiya Dairy Equipment Manufacturing Co., Obihiro (JP)

( * ) Notice: Subject to any disclaimer, the term of this patent is extended or adjusted under 35 U.S.C. 154(b) by 372 days.

(21) Appl. No.: 17/061,288

(22) Filed: Oct. 1, 2020

(65) Prior Publication Data

US 2021/0131746 A1 May 6, 2021

(30) Foreign Application Priority Data

Oct. 30, 2019 (JP) ................. 2019-196842

(51) Int. Cl.
*F28D 20/02* (2006.01)
*F24S 60/30* (2018.01)
(Continued)

(52) U.S. Cl.
CPC ............ *F28D 20/026* (2013.01); *F24S 60/10* (2018.05); *F24S 60/30* (2018.05);
(Continued)

(58) Field of Classification Search
CPC ............ F28D 20/026; F28D 20/0034; F28D 2020/0078; F28D 2020/0082; F24S 60/10; F24S 60/30; F24S 90/00; H02J 3/14; H02J 3/381; H02J 2300/24; H02J 2310/12; H02J 15/00; H05B 1/0244; Y02B 70/30; Y02B 70/3225; Y02E 10/40; Y02E 10/56; Y02E 60/14; Y02E 70/30; Y04S 20/222;
(Continued)

(56) References Cited

U.S. PATENT DOCUMENTS

2008/0156015 A1* 7/2008 Meyerholtz ........... F25D 23/126 222/1
2016/0226305 A1* 8/2016 Estes ....................... H02J 9/062
2020/0284527 A1* 9/2020 Ben Nun ............ F28D 20/0034

FOREIGN PATENT DOCUMENTS

| JP | H7-305873 A | 11/1995 |
| JP | 2009-127894 A | 6/2009 |
| KR | 200234360 Y1 * | 9/2001 |

OTHER PUBLICATIONS

Translation of KR-200234360-Y1.*

* cited by examiner

*Primary Examiner* — Mickey H France
(74) *Attorney, Agent, or Firm* — Knobbe, Martens, Olson & Bear, LLP

(57) ABSTRACT

Electric power is accumulated in another form without using a storage battery so as to more effectively utilize electric power generated by solar power generation. A cold heat source storage system includes a freezer operated by directly utilizing the output power of a solar power generation device, a cold heat source storage chamber cooled by the freezer, a number of water tanks installed in the cold heat source storage chamber, and a heat exchange device installed in the cold heat source storage chamber. The system can be included in heat source storage system, which includes a heater operated by directly utilizing the output power of the solar power generation device, a heat source storage tank which stores water heated by the heater, and a heat exchange device installed in the hot heat source storage tank.

6 Claims, 2 Drawing Sheets

(51) Int. Cl.
| | |
|---|---|
| *F24S 60/10* | (2018.01) |
| *F28D 20/00* | (2006.01) |
| *H02J 3/14* | (2006.01) |
| *H02J 3/38* | (2006.01) |
| *H05B 1/02* | (2006.01) |

(52) U.S. Cl.
CPC ............ *F28D 20/0034* (2013.01); *H02J 3/14* (2013.01); *H02J 3/381* (2013.01); *H05B 1/0244* (2013.01); *F28D 2020/0078* (2013.01); *F28D 2020/0082* (2013.01); *H02J 2300/24* (2020.01); *H02J 2310/12* (2020.01)

(58) Field of Classification Search
CPC ....... Y04S 20/244; F24F 5/0017; F24F 13/30; F24F 2005/0025; F24D 15/02; H02S 10/20
See application file for complete search history.

(a) Apartment building (b) Detached house (c) Storing chamber, Maturing chamber

HEAT SOURCE STORAGE SYSTEM UTILIZING SOLAR POWER GENERATION

CROSS-REFERENCE TO RELATED APPLICATION

This application claims priority to Japanese Patent Application No. 2019-196842 filed on Oct. 30, 2019, the disclosure of which including the specification, the drawings, and the claims is hereby incorporated by reference in its entirety.

TECHNICAL FIELD

The present invention relates to a storage system for a cold heat source or a hot heat source utilizing solar power generation.

BACKGROUND ART OF THE INVENTION

A solar power generation system outputs direct current (DC) power by irradiating sunlight to solar cells. The output DC power is generally converted into an alternating current by an inverter and supplied to various electrical loads. In addition, storage batteries are usually incorporated in a solar power generation system, and surplus power is accumulated in the storage batteries. The power stored in the storage batteries is used to compensate for the shortage of power of solar power generation.

On the other hand, it is disclosed in JP H7-305873A that a system in which ice or snow frozen in winter is stored in an ice storage chamber until summer, and cold air is taken out from the ice storage chamber in summer to use it for cooling or the like, in order to reduce energy consumption used in cooling or the like in summer.

JP 2009-127894A discloses a mobile ice chamber in which natural ice frozen in a water tank in winter is stored in an insulated container, and the container is transported by a vehicle in summer to use as a cold heat source in various places.

BRIEF SUMMARY OF THE INVENTION

In the solar power generation, since power generation amount fluctuates due largely to weather and at day or night, when electric power generated by the solar power generation is accumulated in a storage battery, the capacity of the storage battery could be a problem. Further, it is complicated to control the electric power taken out from a storage battery for utilization, besides, a power loss is also large.

A method of utilizing ice and snow in winter as a cold heat source described in Patent Documents 1 and 2 has a problem that a usable place is limited to a cold district.

The purpose of the present invention is to more effectively utilize the power generated by solar power generation by accumulating it in another form instead of accumulating it in a storage battery.

In order to solve the above problems, the present invention has the following configuration:

The first aspect of the present invention is a cold heat source storage system, comprising:
a freezer operated by directly utilizing the output power of a solar power generation device;
a cold heat source storage chamber cooled by the freezer;
a plurality of water tanks installed in the cold heat source storage chamber; and
a heat exchange device installed in the cold heat source storage chamber for delivering water, which is heat-exchanged with the air in the cold heat source storage chamber, to the outside.

In the first aspect above, it is preferable that water flowing through the heat exchange device circulates with the heat exchange device and the outside.

In the first aspect above, it is preferable that water is supplied from the outside to the heat exchange device, and that the water supplied is to be sent out to the outside through the heat exchange device.

In the first aspect above, it is preferable to have a device for sending out the cooled air in the cold source storage chamber to the outside.

In the second aspect of the present invention is a heat source storage system having the cold heat source storage system in the above first aspect, and a hot heat source storage system which has:
a heater operated by directly utilizing the output power of a solar power generation device;
a hot heat source storage tank which stores water heated by the heater; and
a heat exchange device installed in the hot heat source storage tank for delivering water, which is heat-exchanged with the hot water in the hot heat source storage tank, to the outside.

In the second aspect above, it is preferable that water flowing through the heat exchange device of the hot heat source storage tank circulates between the outside and the device.

In the second aspect above, it is preferable to have a device for sending the water heated in the heat source storage tank to the outside.

In the second aspect above, it is preferable to have a power switching device which switches the output power to either the freezer or the heater, or to both the freezer and the heater. In addition, when the output power is sent to both the freezer and the heater, it is preferable that the ratio of the power to be distributed to each of the freezer and the heater is adjusted.

In place of storing electric power generated by solar power generation in the storage battery, it is possible to utilize the electric power more effectively by accumulating it as a heat source.

DETAILED DESCRIPTION OF THE INVENTION

Hereinafter, referring to the accompanying drawings, the heat source storage system using solar power generation according to the present invention will be described in detail. In the present invention, the electric power generated by solar power generation is stored as a heat source instead of accumulating it in the storage battery. In this case, a "heat source" is a cold heat source having a temperature lower than the temperature of an object to be used, or a hot heat source having a higher temperature than the temperature of an object to be used. The temperature to be used is not strictly defined, but is taken as an average room temperature or water temperature in the daily life in a warm weather. For example, the room temperature is 25° C.±5° C., and the water temperature is 10° C.±5° C., however, it is not limited to these ranges.

Figure 1:
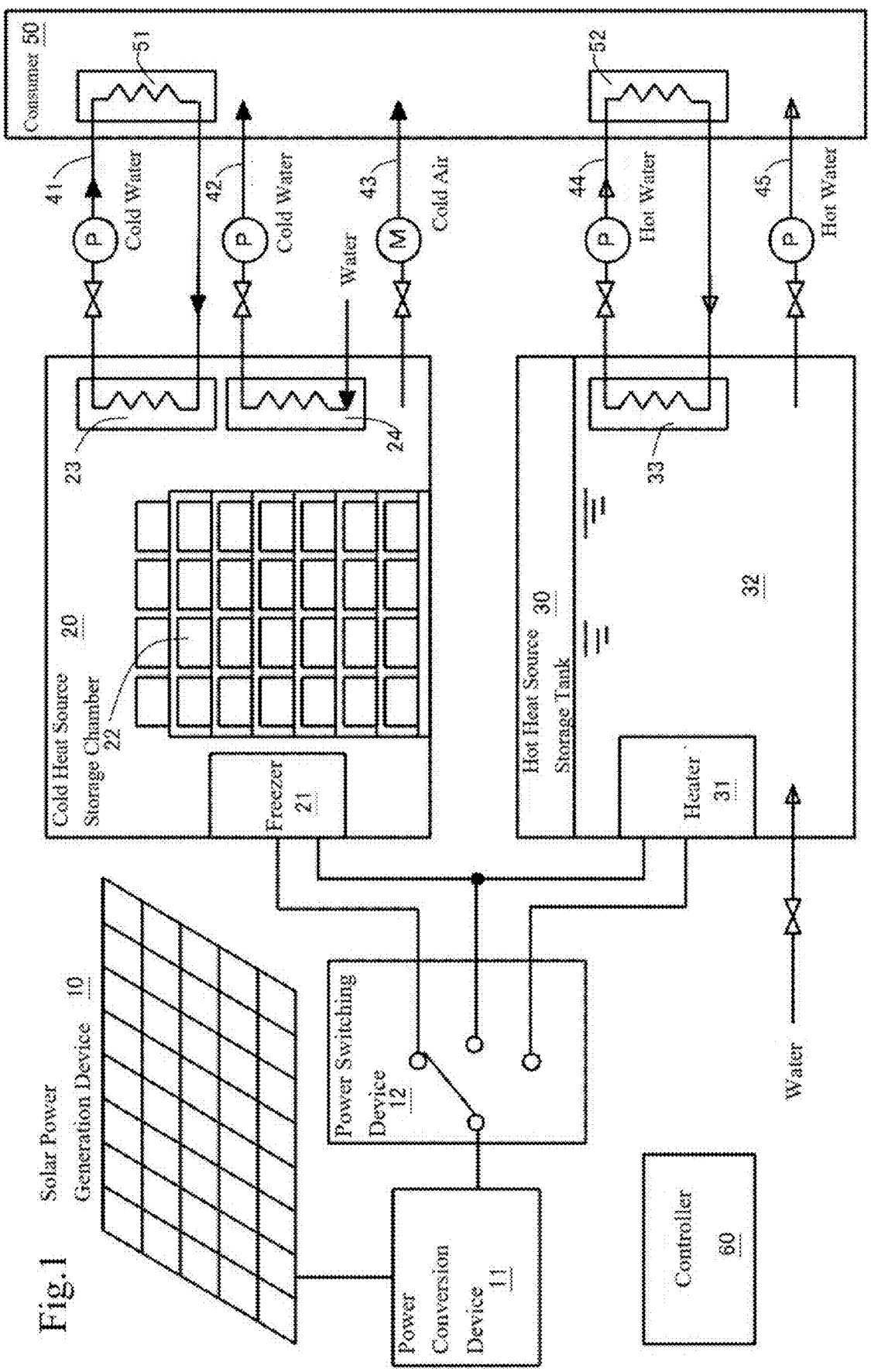
FIG. 1 is a schematic configuration diagram of an example of the heat source storage system using solar power generation according to the present invention.

FIG. 1 is a schematic configuration diagram of an example of a heat source storage system utilizing solar power generation according to the present invention. In FIG. 1, a flow of cold water or cold air is indicated by a black arrow, and a flow of hot water is indicated by a white arrow. A solar power generation device 10 is configured by appropriately connecting solar cell panels. The solar power generation device 10 generates DC power. A power conversion device 11 includes, for example, a power conversion circuit such as a switching power supply and/or an inverter, and outputs an alternating current of an appropriate voltage and frequency, or a direct current of an appropriate voltage.

A power switching device 12 switches the output power of the power conversion device 11 to be sent to either one of a freezer 21 or a heater 31, or to both of them. Although not shown in the drawings, when sending the output power to both of them, the ratio at which the power is distributed can be adjusted. The drive control of the power conversion device 11 and the switching control of the power switching device 12 are conducted, for instance, by an appropriately configured controller 60.

In the case of a device wherein the power conversion device 11 outputs alternate current (AC), and the freezer 21 or the heater 31 operates on the AC as a power supply, the AC of the power conversion device 11 is utilized as a power source for the freezer 21 or the heater 31 as is. Also, in the case of a device wherein the freezer 21 or the heater 31 operates on direct current (DC) as a power supply, such power supply is used through a device (not shown) which converts the AC output of the power conversion device 11 into DC.

Further, in the case of a device wherein the power conversion device 11 outputs direct current (DC), and the freezer 21 or the heater 31 operates on the DC as a power supply, the DC of the power conversion device 11 is utilized as a power source for the freezer 21 or the heater 31 as is. Also, in the case of a device wherein the freezer 21 or the heater 31 operates on alternate current (AC) as a power supply, such power supply is used through a device (not shown) which converts the DC output of the power conversion device 11 into AC.

In any case, the freezer 21 or the heater 31 operates on the output power of the solar power generation device 10 by directly using the output power. "Directly using" means that the output power of the solar power generation device 10 is immediately supplied to the freezer 21 or the heater 31 to be consumed, without being stored in storage batteries.

The freezer 21 is installed in a cold heat source storage chamber 20. The cold heat source storage chamber 20 is provided, for example, as a building or a container having an internal space surrounded by insulated floor, wall and ceiling. In the internal space of the cold heat source storage chamber 20, a plurality of water tanks 22 are provided. A plurality of the water tanks 22 are arranged vertically and horizontally in several rows in each tier, and also several tiers are arranged in a vertical direction. Water is filled in each of the water tanks 22. By operating the freezer 21, the air in the cold heat source storage chamber 20 is cooled, and the water in the water tanks 22 freezes and becomes ice. Frozen ice in the water tanks 22 serves as a cold heat source. In other words, electric power generated by the solar power generation is converted into a cold heat source and is to be accumulated. Also, during a period in which the freezer 21 is even stopped, the air in the cold heat source storage chamber 20 is maintained at a low temperature for a relatively long time by the cold heat source.

Further, in the cold heat source storage chamber 20, heat exchange devices 23 and 24 equipped with heat exchange pipes are installed. While two different heat exchange devices 23 and 24 are shown in FIG. 1, only one heat exchange device may be provided if necessary, or a plurality of either of heat exchange devices 23, 24 may be provided. The heat exchange device conducts heat exchange between the water flowing in the heat exchange pipes and the air in the cold heat source storage chamber 20. The heat-exchanged water is sent out to the outside of the cold heat source storage chamber 20.

In FIG. 1, various external consumers 50 are schematically illustrated. The water flowing through the heat exchange device 23 flows through a cold water line 41, which is provided with a valve for switching between the water supply and the suspension of the water supply, and a pump P for delivery, and flows into another heat exchange device 51 installed in the external consumer 50. The water is returned after the heat exchange is conducted thereat and circulated.

Also, the heat exchange device 24 is supplied with, for example, general tap water or the like from the outside as the water flowing in through. The supplied water flows through the heat exchange device 24 and is supplied to the external consumer 50 through a cold water line 42 provided with an appropriate valve and a pump, and is used as cold water therein.

Further, the cooled air in the cold source storage chamber 20 can be supplied to the external consumer 50 by a cold air line 43 provided with a blower fan M. The supplied cold air is used in the consumer 50. Although not shown in the drawing, in this case, a vent hole is provided in the cold heat source storage chamber 20 for supplementing the air sent out therefrom.

Next, the heater 31 is installed in a hot heat source storage tank 30. The hot heat source storage tank 30 is preferably provided as a tank having an internal space surrounded by insulated peripheral walls. The internal space of the hot heat source storage tank 30 is filled with water supplied from the outside. By operating the heater 31, the filled water is heated to become a hot water 32. The temperature of the hot water 32 is, for example, in the range of 30° C. to 90° C., but is not limited to this range as it depends on various conditions. This hot water 32 serves as a hot heat source. In other words, the electric power generated by the solar power generation is converted into a hot heat source and to be accumulated. During the period in which the heater 31 is even stopped, the temperature of the water in the heat source storage tank 30 is maintained at a high temperature for a relatively long time by the hot heat source.

Further, a heat exchange device 33 equipped with a heat exchange pipe is installed in the hot heat source storage tank 30. Although FIG. 1 shows a single heat exchange device 33, a plurality of heat exchange device may be provided if necessary. The heat exchange device conducts a heat exchange between the water flowing in the heat exchange pipe and the hot water 32 of the hot heat source storage tank 30. The heat-exchanged water is sent out of the hot heat source storage tank 30.

The water flowing through the heat exchange device 33 flows through a hot water line 44 provided with a valve for switching between the water supply and the suspension of the water supply, and a pump P for delivery, and flows into another heat exchange device 52 installed in the external consumer 50. The water is returned after the heat exchange is conducted thereat and circulated.

Further, the hot water 32 of the hot heat source storage tank 30 can be supplied to the external consumer 50 by a hot water line 45 provided with an appropriate valve and a pump P. The supplied hot water is used in the consumer 50. In this case, the water corresponding to the amount of hot water delivered is newly supplemented into the hot heat source storage tank 30.

The supply of cold water, cold air and/or hot water to the external consumer 50 is performed as required by the consumer 50 and can be controlled by the controller 60. Alternatively, it may be controlled by a controller other than the controller 60. The supply of cold water, cold air and/or hot water can be conducted either while the power is supplied to the freezer 21 and/or the heater 31, or while the power supply to either of, or both of those is stopped.

When power is supplied to both of the freezer 21 and the heater 31, the controller 60 can adjust the ratio of power to be distributed to each of the freezer 21 and the heater 31. For example, when the demand for cold water and cold air increases and the temperature in the cold heat source storage chamber 20 rises, it is possible to increase the power to be distributed to the freezer 21. Further, when the demand for hot water is increased and the temperature in the hot heat source storage tank 30 decreases, the controller 60 can increase the power to be distributed to the heater 31. As a specific example, a switching power source (not shown) is provided at the input portion of each of the freezer 21 and the heater 31, and the power supplied to each device can be adjusted by controlling a duty ratio of a PWM (Pulse Width Modulation) signal that controls switching of each switching power source. It is preferable that each of the cold heat source storage chamber 20 and the hot heat source storage tank 30 has a sensor (not shown) which detects the internal temperature thereof and notifies the controller 60 of the temperature thereof.

In addition, in the present invention, a system could be either a cold heat source storage system which utilizes cold water and/or cold air, providing only with the cold heat source storage chamber 20, or a hot heat source storage system utilizing a hot water providing only with the hot heat source storage tank 30.

Figure 2:
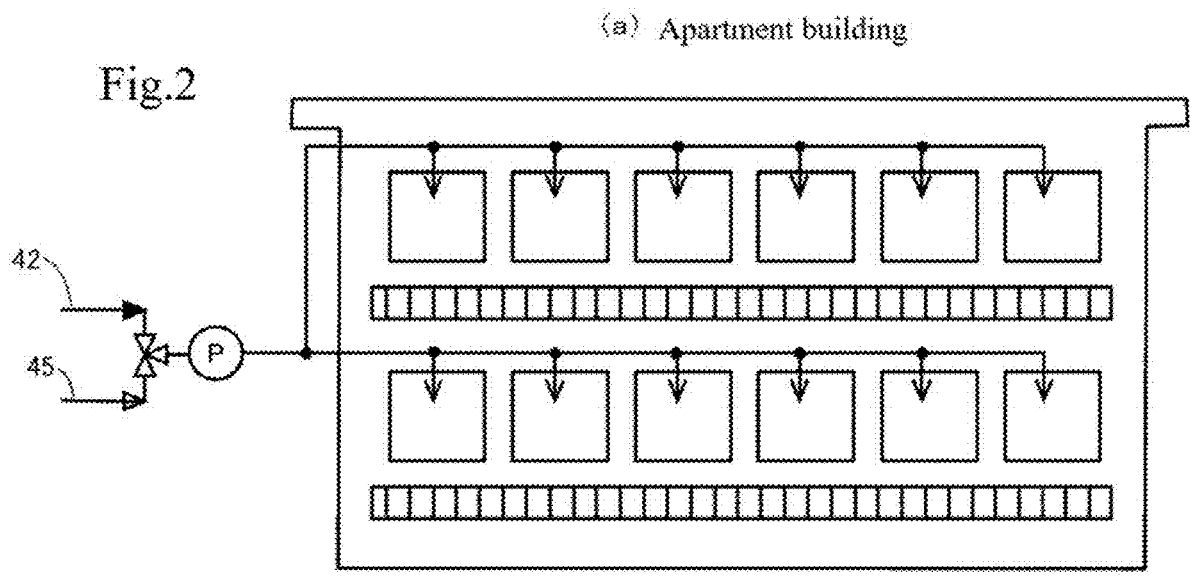
FIGS. 2(a), (b) and (c) show examples of use of the heat source storage system shown in FIG. 1.
Figure 2:
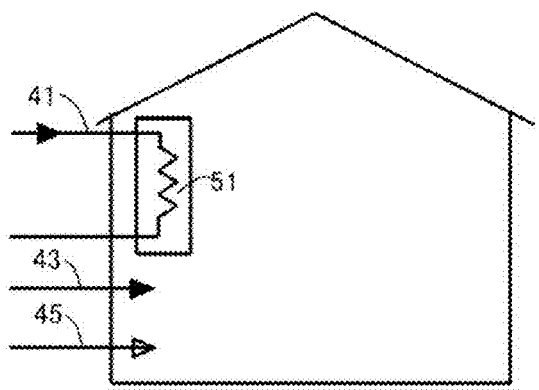
Figure 2:
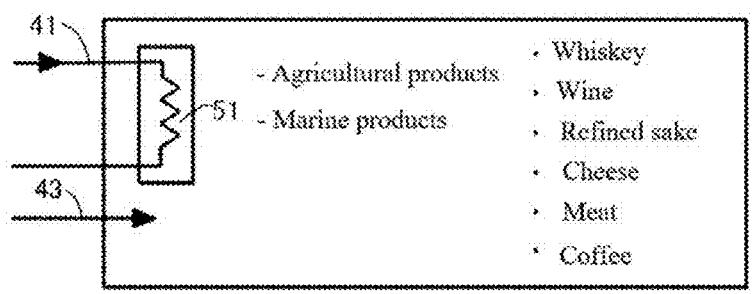

FIG. 2 shows some usage examples of the heat source storage system shown in FIG. 1, by a user. However, the usage of the present invention is not limited to those.

FIG. 2(a) shows a usage example of the system in an apartment building. The cold water line 42 and the hot water line 45 are connected via a three way valve. In this way, hot water or cold water can be switched for use, and hot water or cold water is supplied to each house. The switching valve for hot water and cold water may be provided in each house.

FIG. 2(b) shows a usage example of the system in a detached house. The cold water line 41, the cold air line 43, and the hot water line 45 are connected. The circulating water flowing through the cold water line 41 is used for cooling and refrigerating via the heat exchange device 51. Also, the air flowing in the cold air line 43 is used for cooling and refrigerating.

FIG. 2(c) shows an example of use of agricultural products or marine products in a storage chamber or a maturing chamber. The circulating water flowing in the cold water line 41 is used for cooling and maturing agricultural and marine products via the heat exchange device 51. In addition, air flowing through the cold air line 43 is used for cooling and maturing.

The heat source storage system according to the present invention may be implemented at any location on the earth, as long as it is capable of implementing the solar power generation. In addition, it is also possible to store the electric power of the solar power generation selectively at either or both of the cold heat source and the hot heat source, if necessary. For example, in summer, by operating a freezer, the electric power can be stored as a cold heat source so that cold water or cold air can be used, and in winter, by operating a heater, the electric power can be stored as a hot heat source so that hot water can be used. However, since the present invention does not depend on seasons, it is possible to store the generated power as a cold heat source and also a heat source. As in the above embodiment, a combination of a cold heat source and a hot heat source is also possible.

When the electric power of the solar power generation is consumed directly at a freezer or a heater, the loss of power is far less than the case when the generated power is stored in batteries and then taken out and consumed. Therefore, according to the present invention, power generated by natural energy can be effectively utilized, in view of the whole.

The embodiment of the present invention described above shows some examples, and other than these, a variety of changed forms to which various kinds of publicly known arts are applied is possible, and it is regarded that the present invention also includes those forms.

10. Solar Power Generation Device
11. Power Conversion Device
12. Power Switching Device
20. Cold Heat Source Storage Chamber
21. Freezer
22. Water Tank
23, 24 Heat Exchange Device
30. Hot Heat Source Storage Tank
31. Heater
32. Hot Water
33. Heat Exchange Device
41. Cold Water Line (Circulation)
42. Cold Water Line
43. Cold Air Line
44. Hot Water Line (Circulation)
45. Hot Water Line
50. Consumer
51, 52 Heat Exchange Device
60. Controller

What is claimed is:

1. A cold heat source storage system comprising:
   a freezer which is operated by directly utilizing the output power of a solar power generation device;
   a cold heat source storage chamber which is cooled by the freezer;
   a plurality of water tanks installed in the cold heat source storage chamber; and
   a heat exchange device installed in the cold heat source storage chamber for delivering water, which is heat-exchanged with the air in the cold heat source storage chamber, to the outside,
   wherein water flowing through the heat exchange device circulates between the heat exchange device therein and the outside.

2. A heat source storage system comprising:
   the cold heat source storage system which comprises:
      a freezer which is operated by directly utilizing the output power of a solar power generation device;
      a cold heat source storage chamber which is cooled by the freezer;

a plurality of water tanks installed in the cold heat source storage chamber; and a heat exchange device installed in the cold heat source storage chamber for delivering water, which is heat-exchanged with the air in the cold heat source storage chamber, to the outside, and a hot heat source storage system which has:

a heater operated by directly utilizing the output power of a solar power generation device;

a hot heat source storage tank which stores water heated by the heater; and a heat exchange device disposed in the hot heat source storage tank for delivering water, which is heat-exchanged between the hot water in the hot heat source storage tank, to the outside.

3. The heat source storage system according to claim 2, wherein water flowing through the heat exchange device of the hot heat source storage system is circulated between the device therein and the outside.

4. The heat source storage system according to claim 2, further comprising a device for delivering the hot water in the hot heat source storage tank to the outside.

5. The heat source storage system according to claim 2, further comprising an electric power switching device for switching between either sending the output power to either one of the freezer or the heater, or sending the output power to both of them.

6. The heat source storage system according to claim 5, wherein the ratio of power to be distributed to each of the freezer and the heater is adjusted, when sending the output power to both of the freezer and the heater.

* * * * *